(12) United States Patent
Yoshida

(10) Patent No.: US 8,708,563 B2
(45) Date of Patent: Apr. 29, 2014

(54) LINEAR MOTION GUIDE UNIT

(75) Inventor: Yoshihiro Yoshida, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 13/556,849

(22) Filed: Jul. 24, 2012

(65) Prior Publication Data

US 2013/0034319 A1  Feb. 7, 2013

(30) Foreign Application Priority Data

Aug. 4, 2011  (JP) .................. 2011-171228

(51) Int. Cl.
*F16C 29/06* (2006.01)

(52) U.S. Cl.
USPC ........................................... 384/43

(58) Field of Classification Search
USPC .................... 384/43–45, 49, 50, 59
See application file for complete search history.

(56) References Cited

U.S. PATENT DOCUMENTS

| | | | | |
|---|---|---|---|---|
| 4,438,986 A | * | 3/1984 | Teramachi | 384/43 |
| 4,932,279 A | * | 6/1990 | Kasuga | 74/89.32 |
| 5,248,202 A | * | 9/1993 | Kawasugi et al. | 384/45 |
| 5,385,406 A | * | 1/1995 | Ichida et al. | 384/45 |
| 6,752,532 B2 | * | 6/2004 | Mochizuki | 384/50 |

FOREIGN PATENT DOCUMENTS

JP  2565426 Y2  5/1994

* cited by examiner

*Primary Examiner* — Alan B Waits
*Assistant Examiner* — Brian McGovern
(74) *Attorney, Agent, or Firm* — Browdy and Neimark, PLLC

(57) ABSTRACT

A connector plate makes it possible to join together carriages with high rigidity and much load rating no matter lengthwise dimensions of the carriages. The carriage has at leading and trailing ends thereof the connector plates identical in structure. The connector plate on a front surface thereof has a tenon or projection and a mortise which are spaced widthwise from each others. The adjoining carriages are joined together after the connector plates have been placed each other in a relation the their front surfaces have made direct engagement face-to-face with each other with the tenon having fit into the mortise to make the tenon-and-mortise joint.

9 Claims, 10 Drawing Sheets

LINEAR MOTION GUIDE UNIT

FIELD OF THE INVENTION

The present invention relates to a linear motion guide unit in which a slider is allowed to slide along an elongated guide rail relatively to the guide rail through the use of a plurality of rolling elements, and more particularly to the slider having carriages joined each other in a lengthwise or sliding direction by means of connecting members.

BACKGROUND OF THE INVENTION

Linear motion guide units have been extensively installed in recent years between parts with slide relative to one another in machinery including machine tools, assembling machines, transporting machines, and so on. Of the different size and type linear motion guide units, there have been known sliders which have the carriages joined each other by couplers or connecting plates.

In a commonly-owned Japanese Utility Model Registration No. 2,565,426, there is disclosed a linear motion guide unit composed of a guide rail having raceway grooves extending lengthwise of the guide rail, a slider which fits over or conforms to the guide rail and has raceway grooves extending in opposition to the raceway grooves on the guide rail to define load-carrying races between them, and a plurality of rolling elements arranged in line in circulating circuits including the load-carrying races. The slider travels relatively to the guide rail via the rolling elements, which roll through the circuits while carrying heavy loads in the load-carrying races. The slider is further composed of plural carriages having the load-carrying races therein and juxtaposed in the lengthwise direction, and couplers having therein raceway grooves continuing the load-carrying races. The couplers are each interposed between two adjoining carriages. The raceway grooves in the couplers are somewhat larger in cross section than the load-carrying races in the carriage.

With the prior linear motion guide unit, the carriages are juxtaposed in the lengthwise direction and the couplers are made of synthetic resin and arranged between two adjacent carriages as stated earlier. The raceway grooves in the couplers, because they are larger than the load raceway grooves in the carriages, help relieve the rolling elements of a locally crowded or huddled state that would occur in the load-carrying races in the carriages. Moreover, retainer plates are secured to lower surfaces of the slider to join together the carriages in the lengthwise direction. The couplers are provided on their forward and aft ends thereof with projections raised above the ends and the carriages on their forward and aft ends thereof have recesses sunken below the forward and aft ends in complementary relationship to the projections on the ends of the adjoining couplers. Thus, the complementary relationship between the projections of the couplers and the recesses of the carriages help keep the carriages and the couplers from moving past each other in a direction perpendicular to the lengthwise direction of the slider. The retainer plates keep the rolling elements from falling away and apart from the raceway grooves in the carriages and have thereon lower seals. With the linear motion guide unit in which the carriages are joined to each other by the retainer plates fastened to the lower side of the slider, however, it is needed to reserve various types of the retainers in preparation for connections of carriages of different lengths. Moreover, the overall length of the slider is not increased by the lengthwise dimensions of the couplers. As the raceway grooves in the couplers have no construction taking part in carrying the loads applied to the slider, the increase in the load rating is less, compared with the increase in the length of the slider by the addition of the couplers.

SUMMARY OF THE INVENTION

The present invention, therefore, has as its primary object to overcome the problem as described just above and to further provide a linear motion guide unit in which carriages, no matter their length, are joined each other without additionally work or processes, and further with no coupler as used in the prior art, but by only using joint members interposed between adjoining carriages. More particular, the present invention provides a linear motion guide unit in which the joint members are constructed of two flat connector plates identical in shape to each other, the joint members being fastened to lengthwise opposite ends of the carriages, one to each end. The joint members are universally available to join together firmly carriages having different longitudinal dimensions. The carriages are selected depending on the space permitted for a completed slider, and juxtaposed in series in the lengthwise direction. The connector plates, because of being simply fastened to the carriages using threaded holes existing on the ends of the carriages, help provide a high stiffness or rigidity and a large load rating with no need of additional working on the carriages to fasten the connector plates on the carriages.

The present invention is concerned with a linear motion guide unit comprising; a guide rail having first raceway grooves extending lengthwise on both longitudinal sides thereof, and a slider that fits over or conforms to the guide rail for movement relative to the guide rail, the slider being composed of carriages adjacent to each other and juxtaposed in series in a lengthwise direction, the carriages each having second raceway grooves lying in opposition to the first raceway grooves of the guide rail to define load-carrying races between the first raceway grooves and the second raceway grooves and return passages extending in parallel with the second raceway grooves, end caps secured on opposite ends of the carriage and the end caps comprising turnaround passages to connect the load-carrying races with the return passages, and a plurality of rolling elements allowed to roll through circulating circuits each made up of the load-carrying race, return passage and the turnaround passages;

wherein the adjacent carriages are joined together with two sheets of joint members which are composed of connector plates each having the same structure, the connector plates being fastened to the carriages, one to each carriage, so as to face each other on front surfaces thereof, and the connector plates each being provided on the front surfaces thereof with a tenon or projection and a mortise which are widthwise spaced away from each other; and wherein the adjacent carriages are joined together in a geometry such that the connector plates are in face-to-face engagement on the front surfaces thereof and the tenons fit into the mortises to form tenon-and-mortise joints.

In the present invention, there is disclosed a linear motion guide unit in which the connector plates are secured to the carriages by means of screws which are extended through fastening holes in the connector plates and tightened into threaded holes drilled in the ends of the carriages. Moreover, the connector plates face each other to fit the tenons into the mortises to form the tenon-and mortise joints on the connector plates and locking members of locking pins are inserted through holes aligned in the tenons and the mortises to join together the connector plates. Moreover, the locking pins are inserted through the holes in the tenons and the mortises from side surfaces of the joined connector plates in a direction perpendicular to a traveling direction of the slider.

In the present invention, there is disclosed a linear motion guide unit in which the connector plates each have a socket, a first spigot and a second spigot which are integral with the connector plate and conform in place to the return passages, the first spigot being raised above the front surface of the connector plate and the second spigot being raised above a rear surface of the connector plate, and wherein the first spigot on one of the connector plates facing each other on the front surfaces thereof fits into the socket on a counterpart of the connector plates. Moreover, upon a phase in which the adjoining carriages are joined together with the connector plates, the first spigots on the connector plates extend past through the sockets on the counterparts into the adjoining carriages to fit at tips of the first spigots into bores in the adjoining carriages and at the same time the second spigots on the connector plates each fit into the bore in its-own-side carriage.

In the present invention, there is disclosed a linear motion guide unit in which the connector plate has third raceway grooves which communicate with the second raceway grooves of the carriages and return passage segments which are communicate with the return passages in the carriages, the return passage segments in the connector plate extending through across the first spigots and the second spigots which are integral with the connector plate. Moreover, the first spigot is raised above the front surface of the connector plate across a height larger than a thickness of the connector plate and after the adjoining connector plates have been joined each other in a relation the front surfaces thereof placed in direct face-to-face engagement with each other, the first spigots on the adjoining connector plates extending past through the sockets in the counterparts into the bores into which sleeves are inserted to provide the return passage, thereby keeping in place, at tips of the first spigots, the connector plates with respect to the carriages. In another aspect of the present invention, a linear motion guide unit is disclosed in which the connector plate has retainer parts integral with the connector plate in conformity with retainer plates which are fastened to the carriage to keep the rolling elements from falling away from the carriage, the retainer parts extending inwardly of side bulges of the connector plate to correspond in place to retainer plates after the connector plates have been fastened to the carriages, and the retainer parts are recessed to fit over ends of the retainer plates to set in place the connector plates relative to the retainer plates.

With the linear motion guide unit in which the adjoining carriages are joined together by using two joint members of the connector plates identical to each other, the connector plates having mating parts on their front surfaces that are fastened in advance to lengthwise opposite ends of the carriages. Thus, the adjacent carriages may be joined together certainly and firmly through the connector plates which are placed in relation to each other so that their front surfaces come face-to-face with each other to form a complimentary-fit between the mating parts. Moreover, the connector plates may be mounted on the ends of the carriage with two screws driven into the existing threaded holes which have been already drilled in the ends of the carriage to secure the end caps and the end seals to the carriage, so that there is no need of additional hole-making operations on the carriages to fasten the connector plates on the carriages. With the linear motion guide unit constructed as stated earlier, namely, the desired number of the carriages may be securely, easily joined together in the lengthwise direction with no need of additional working on the carriages. The connector plates added to the carriages, even having the raceway grooves to allow the rolling elements rolling through with no load, have neither of the turnaround passages in the end caps nor the lips of the end seals, thereby being remarkably less in lengthwise dimension in the traveling direction of the slider, compared with a totaled overall length of the end caps with the end seals. As a result, the adoption of the connector plates instead of the end caps with the end seals helps increase the ratio of the totaled overall length of the carriages bearing the load with the overall length of the slider, thereby providing the linear motion guide unit high in stiffness or rigidity and large in load capacity or load rating. As the connector plates enable connection and/or disconnection between the adjoining carriages, the carriages varied in lengthwise dimension can be freely selected and combined according to the design considerations of the desired length of the slider. As the part specialized for the slider is only the connector plate, most of the existing parts are interchangeable. This permits the different sliders to be made at low unit costs.

With the connector plate having mating parts to make the complimentary-fit, the locking pins are inserted through holes aligned in the mating parts, or the tenons and the mortises, to keep the carriages from relative movement in the traveling direction of the slider. Thus, joint and/or separation between the adjoining carriages are carried out by insertion and/or withdrawal of the locking pins with respect to the holes in the mating parts. More particularly, the locking pins serving as the separation prevention members are designed to be inserted and/withdrawn from side surfaces of the joined connector plates. This insertion and/withdrawn of the locking pins means that the locking pins can be applied and/or withdrawn from the laterals of the joined connector plates even after the instruments and so on have been mounted on the top or mounting surface of the slider. Moreover, the connector plate has the construction constituting a part of circulating circuit through which the rolling elements roll, or the raceway grooves which communicate with the raceway grooves of the carriages, but bear no load therein, and return passage segments which communicate the return passages in the carriages with each other. Thus, the circulating circuit may be completed only by the addition of the connector plates without the need of any other parts or components. Upon a phase in which the adjoining connector plates have been joined with each other, the spigots on the adjoining connector plates extend through the sockets on the counterparts into the bores into which the sleeves are inserted to provide the return passage, thereby making it possible to keep in place at their tips the connector plates with each other, without machining anew on the ends of the carriages in preparation for the mutual joining of the carriage with the connector plate. Moreover, the return passage segment is constituted with only one of the connector plates joined together. This construction helps reduce the adverse influence of any gaps which would be caused due to a misalignment in location at the joint between the parts. Further, another spigot on the connector plate that constitutes the return passage has an end to make complementary-fit with a relevant end of the sleeve for the circulating circuit in the carriage, thereby keeping the circulating circuit in place.

DETAILED DESCRIPTION OF THE PREFERRED EMBODIMENTS

Figure 1:
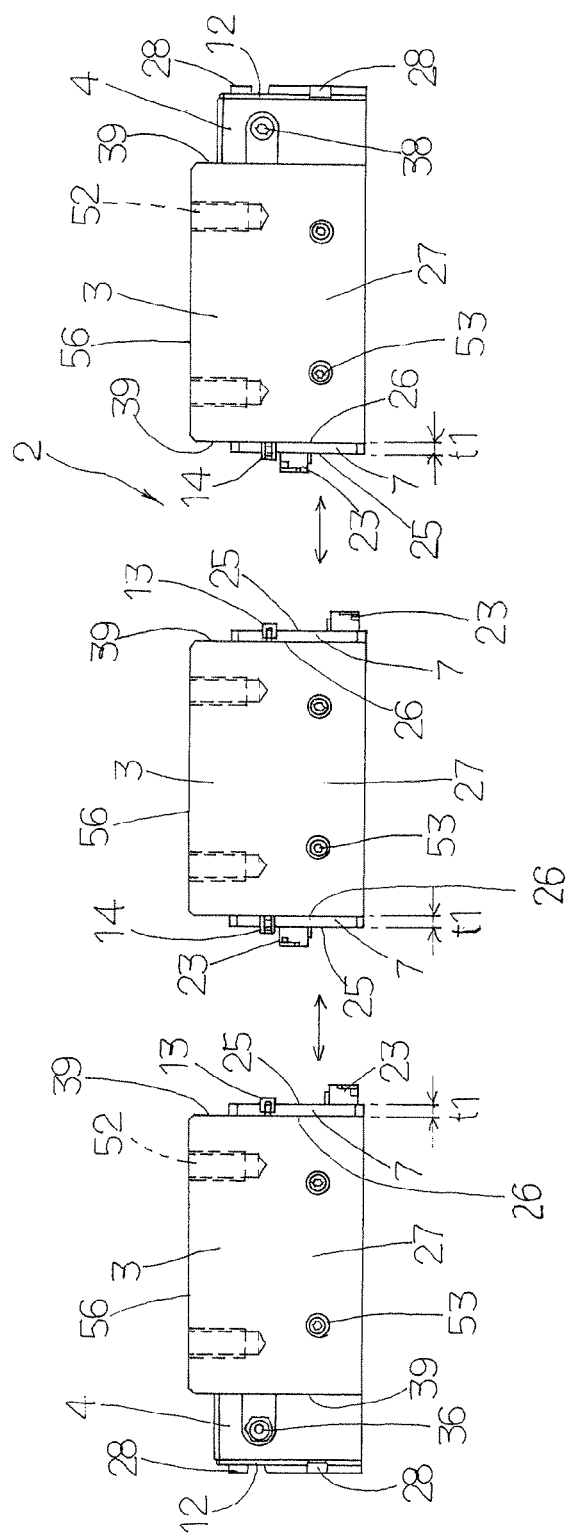
FIG. 1 is a view in side elevation explanatory of a linear motion guide unit according to the present invention, in which carriages are shown separated from each other before assembly in a slider.

The linear motion guide unit in accordance with the present invention is adapted for extensive use in a relative sliding system of a variety of machinery including semiconductor fabricating equipment, machine tools, seismic isolation systems, linear reciprocating motion mechanisms, assembling machines, conveyors, mechanical robots, precision machinery, measurement/inspection instruments, medical equipment, and so on.

A preferred embodiment of the linear motion guide unit according to the present invention will be hereinafter described with reference to the accompanying drawings.

The linear motion guide unit of the present invention is in general comprised of an elongated guide rail 1 provided on lengthwise sides 37 thereof with relief grooves 42 in which raceway grooves or first raceway grooves 16 are formed, two raceway grooves on each side, and a slider 2 that fits over and conforms to the guide rail 1 in such a way as to move relative to the guide rail 1. A version of the linear motion guide unit of the present invention discussed here is of a so-called roller-type in which four rows of load-carrying races 40 are provided. On the sides 37 of the guide rail 1, the raceway grooves 16 having races are formed, two races on each side. The slider 2 is mainly composed of carriages 3 juxtaposed in series in a lengthwise direction and joined together. The carriages 3 each have raceway grooves or second raceway grooves 17 having races lying in opposition to the raceway grooves 16 on the guide rail 1 and return passages 20 extending in parallel with the second raceway grooves 17, end caps 4 fastened to lengthwise opposite ends 39 of the slider 2 and made therein with turnaround passages 15 to communicate the load-carrying races 40 with the return passages 20, and a plurality of rollers 10 rolling through circulating circuits 30. Each circulating circuit is made up of the load-carrying race 40, paired turnaround passages 15 and the return passage 20. The rollers 10 roll through the circulating circuits 30 as the slider 2 moves relative to the guide rail 1 in a sliding manner. The circulating circuits 30 are arranged in pairs to intersect one another in a fashion staggered lengthwise with respect to one another at their turnaround passages 15. The slider 2 has the carriages 3, each of which has therein the return passages 20 and the raceway surfaces of the raceway grooves 17 to form the load-carrying races 40. Each end cap 4 is constituted by an end cap major part 5 that defines an outside curved groove of the turnaround passage 15 and a spacer part 6 that defines an inside curved groove of the turnaround passage 15. Moreover, the end caps 4 have lubrication ports, one of which is connected with a grease nipple 36, while the other threaded hole that is not to be put to lubrication use, is plugged with any closure 38.

Figure 4:
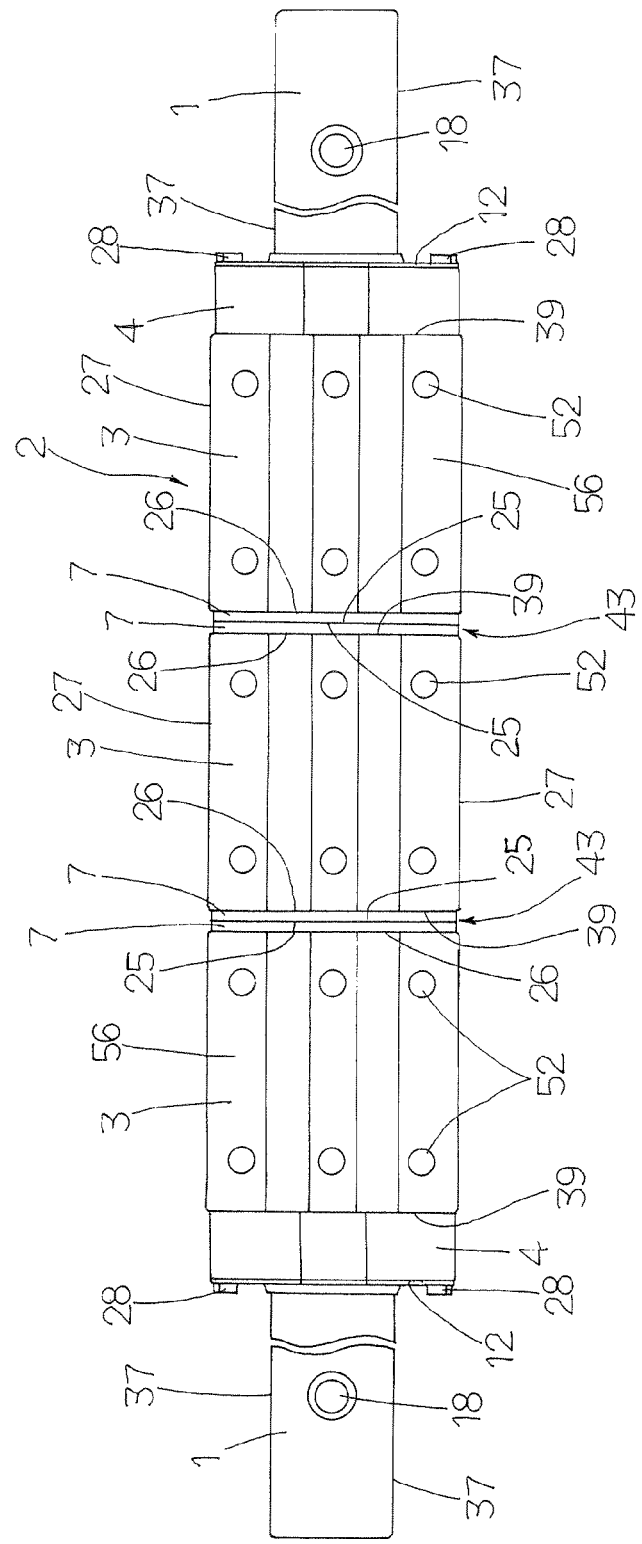
FIG. 4 is a view in plan, partially broken away, showing a preferred embodiment of the linear motion guide unit in accordance with the present invention.
Figure 5:
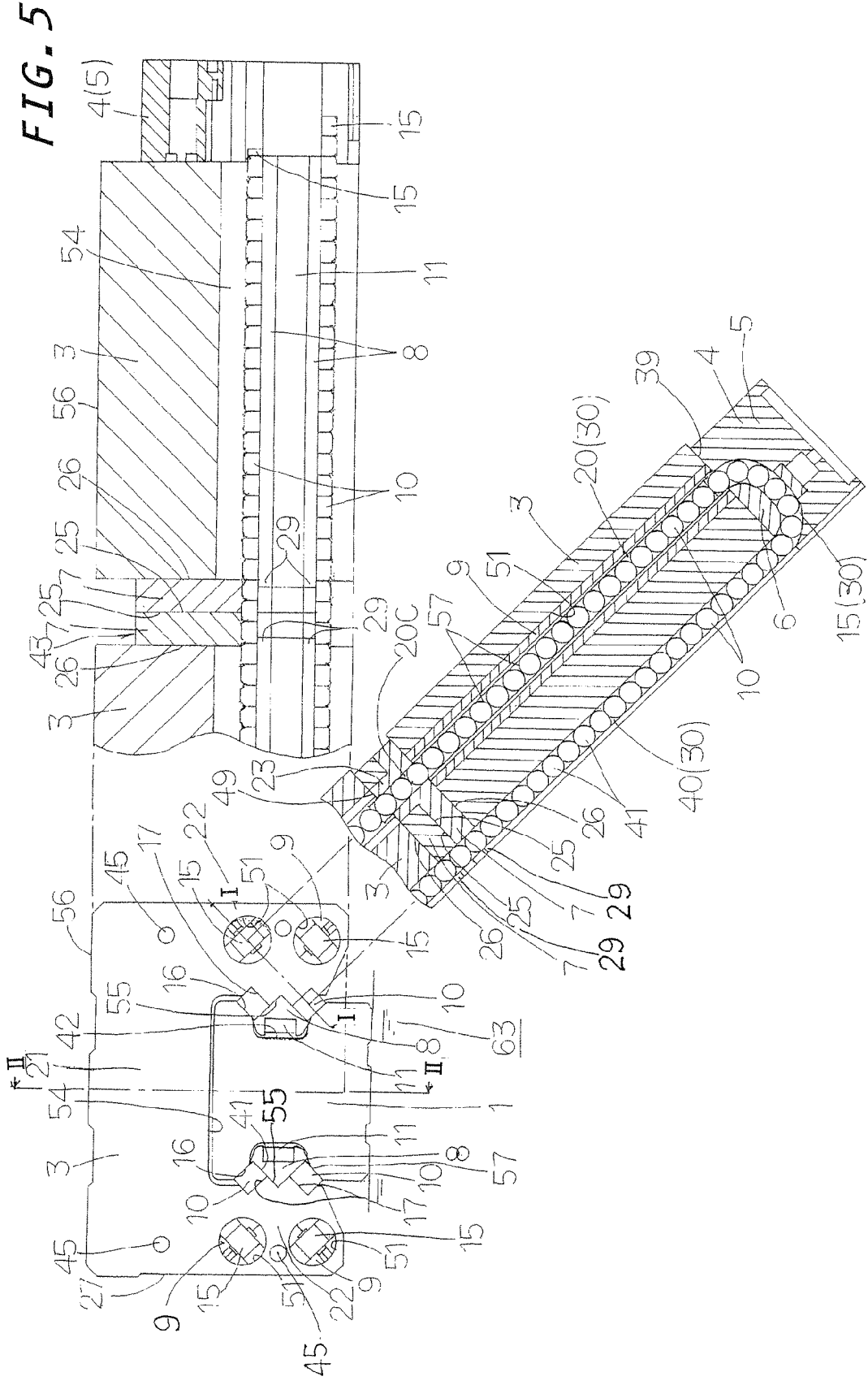
FIG. 5 is a view explanatory of the slider, in combination, a view in end elevation of the carriage, a view in longitudinal section taken on the plane of the line I-I of this figure to show a circulating circuit in the slider, and a view in longitudinal section taken on the plane of the line II-II passing lengthwise through the widthwise midway plane of the slider.
Figure 6:
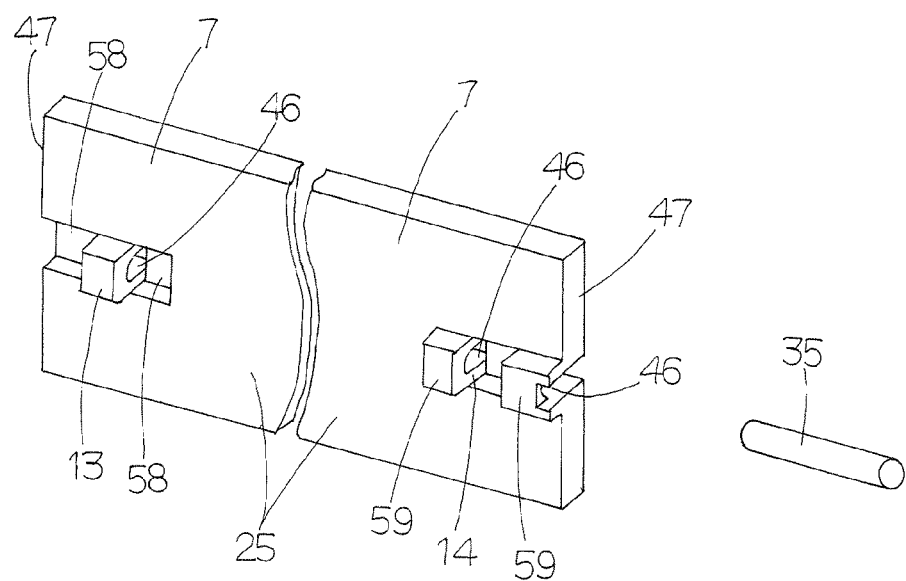
FIG. 6 is a view in perspective, partially broken away, of the connector plate to shown the details of a mortise-and-tenon construction in the connector plate.
Figure 7:
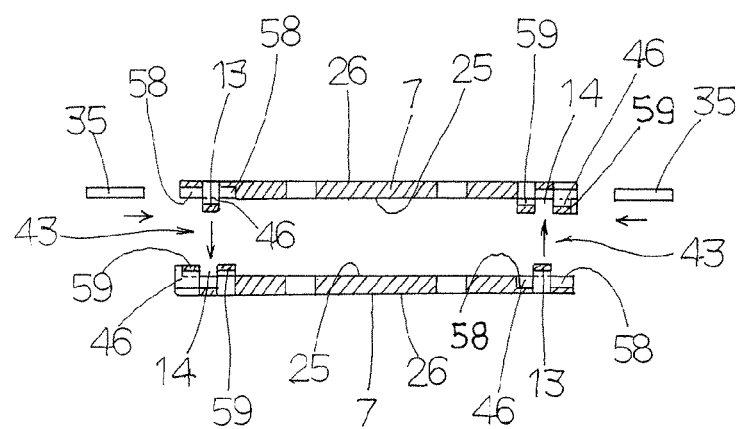
FIG. 7 is a view explanatory of the geometrical relationship of two connector plates with locking pins.

With the linear motion guide unit constructed as shown in FIGS. 4 and 5, the guide rail 1 has bolt holes 18 which are used to mount the guide rail 1 to a base 63 such as a machine bed, or other machinery. The carriage 3 is made up of an upper portion 21 having threaded holes which are used to fasten any instruments or parts to the carriage 3 and side bulges 22 lying on widthwise opposite sides of the upper portion 21 to define a recess 54 between the side bulges 22. The bulges have bores 51 into which sleeves 9 are inserted to provide the return passages 20. The turnaround passages 15 are arranged in pairs in the end caps 4 so as to intersect one another in a fashion staggered lengthwise with respect to one another. The circulating circuits 30 are designed to come into rolling contact with circular rolling surfaces 57 of the rolling elements (rollers) 10 and at the same time come into sliding contact with axially opposite ends 41 of the rollers 10, thereby making it possible to guide the rolling elements 10 in good rolling order without leaning in rolling posture. The return passages 20 defined inside the sleeves 9 inserted in the bores 51 in the carriages 3 are also designed to get the rollers 10 moving one after another in a successive array. Retainer plates 8 lying in opposition to the raceway grooves 17 on the carriage 3 are disposed to keep the rollers 10 from falling away (separating) from the load-carrying races 40 in the slider 2. The retainer plates 8 are held in lengthwise grooves 55 cut deep in the inside surfaces of the recess 54 in the carriage 3 and bolted on the carriage 3 with using fastening bolts 53 and fastening members 11. The retainer plates 8 fit into the relief grooves 42 on the guide rail 1 after the slider 2 has fit over the guide rail 1.

Figure 2:
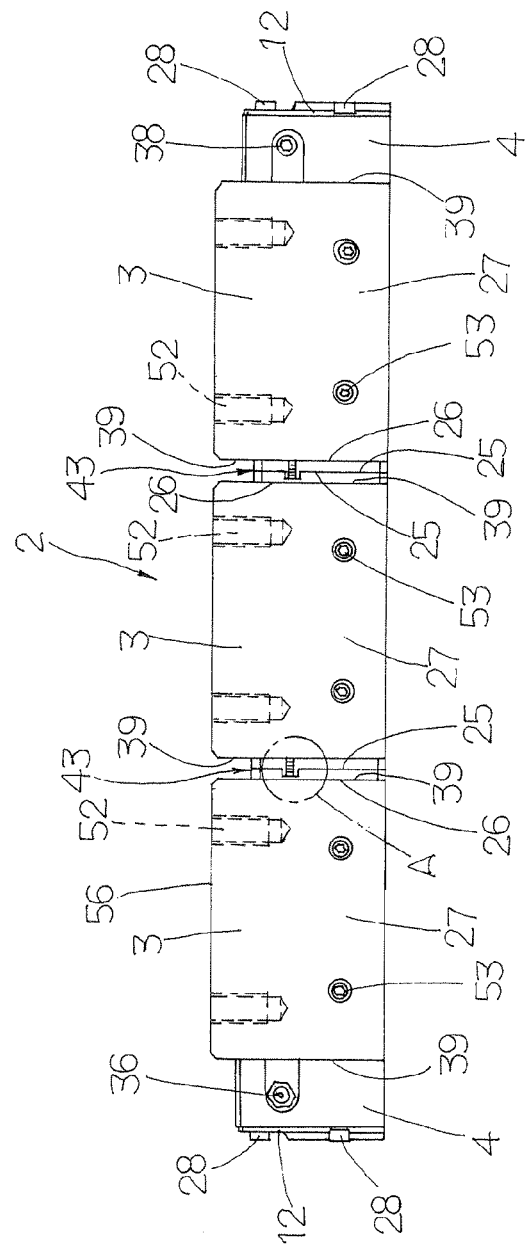
FIG. 2 is a view in side elevation of the slider for the linear motion guide unit according to the present invention, in which the carriages are shown as being joined together each other through connector plates.
Figure 3:
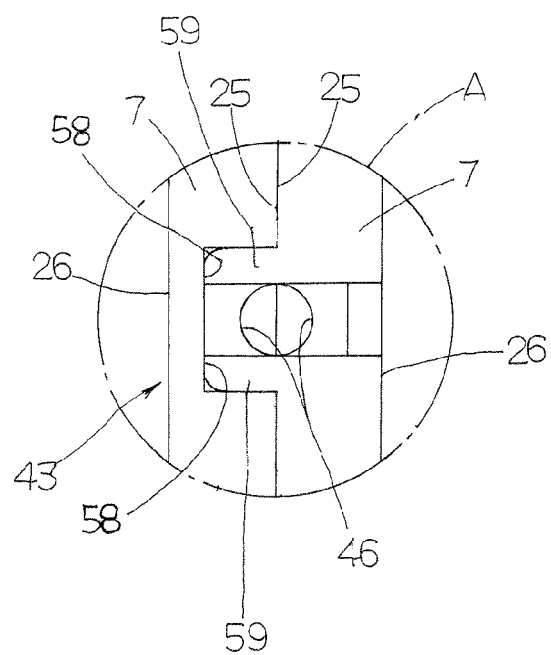
FIG. 3 is an enlarged fragmentary detail showing an area encircled with a sign A of FIG. 2 to illustrate joint construction in the mated connector plate.

The linear motion guide unit of the present invention features a plurality of the carriages 3, three carriages 3 in the version shown in FIGS. 1, 2 and 4, juxtaposed in series in a lengthwise direction and joined together with mating parts 43 on two connector plates 7 which are the same in construction and assigned to the adjoining carriages 3, one to each carriage 3. The number and length of the carriage(s) 3 can be determined depending on the load applied on the slider. Thus, it is easier to increase the load rating of the slider to have heavier load-carrying capacity. With the slider 2 constructed as earlier described, that is, the carriages 3 juxtaposed in series in the lengthwise direction are mutually joined, using the mating parts 43 on the connector plates 7 between the adjoining carriages 3. Of the carriages 3 arranged in the traveling direction of the slider 2, only the leading carriage 3 and the trailing carriage 3 have end caps 4 on their outward ends 39. Moreover, end seals 12 are placed on the outward ends of the end caps 4. Fastening screws 28 are driven from outward ends of the end seals 12 into threaded holes 45 in the carriages 3 to tighten the end seals 12 together with the end caps 4 onto the carriages 3. The mating parts 43 are designed to make close engagement between confronting front surfaces 25 of two sheets of the connector plates 7 which are detachably mounted on the adjoining carriages 3, one to each carriage 3, using screws and the like. The connector plates 7 having the mating parts 43 thereon are each composed of an upper portion 60 and side bulges 34 extending downwards from widthwise opposite ends of the upper portion 60 so as to conform in shape to the ends 39 of the carriage 3 to be fastened on the carriage 3. The two sheets of the connector plates 7 are the same in size and shape, and made of the same material.

Moreover, the connector plates 7 have rear surfaces 26 facing the ends 39 of the carriages 3 and the front surfaces 25 facing each other with their counterparts, the rear surfaces 26 and the front surfaces 25, extending in parallel with each other. The connector plates 7 are attached or mounted on the ends 39 of the carriages 3, one to each end 39. The connector plates 7 on their front surfaces 25 thereof opposite to each other have the mating parts 43 of tenons or projections 13 at one of the widthwise opposite sides thereof and the mating parts 43 of the mortises, holes or cavities 14 at another of the widthwise opposite sides thereof. The carriages adjoining each other are joined together after the connector plates 7 have been brought into a surface-to-surface relationship between the front surfaces 25 thereof. Then the tenon 13 on one of the connector plates 7 is inserted into the mortises 14 in the counterpart connector plate 7. The connector plates 7 are secured to the carriages 3 by means of screws 44, which are extended through fastening holes 31 in the connector plates 7 and driven into threaded holes 45 drilled in the ends 39 of the carriages 3. More particularly, how the connector plates 7 are joined to each other is as follows. One connector plate 7 fastened to the end 39 of one of the adjoining carriages 3 and the other connector plate 7 fastened to another of the adjoining carriages 3 are matched to each other in a relationship such that the front surfaces 25 of the connector plates 7 come into close contact with each other. Then, the tenon 13 on the one connector plate 7 fits into the mortise 14 in the other connector plate 7 opposite to the tenon 13, while the mortise 14 in the one connector plate 7 fits over the tenon 13 on the other connector plate 7 opposite to the tenon 13. As a result, tenon-and-mortise engagements are finished between the opposing connector plates 7 to join together the adjoining carriages 3.

With the linear motion guide unit of the present invention, the connector plate 7 is mounted on the end 39 of the carriage 3 with two screws 44 extended through the fastening holes 31 in the connector plate 7 and driven into the existing threaded holes 45, which threaded holes 45 are drilled in the end 39 of the carriage 3 to secure the end cap 4 and the end seal 12. The fastening holes 31 in the connector plate 7 are counter-bored to have counter sinks 32 to seat the heads of the screws 44 wholly below the front surfaces 25 of the retainer plate 15.

The threaded holes 31 and their counter sinks 32 in the connector plates 7 are designed to match in locations with the threaded holes 31 and their counter sinks 32 on the counterpart connector plates 7 after the connector plates 7 have come face-to-face with each other on their front surfaces 25 thereof. After the tenons 13 have fit into the mortises 14 to make the tenon-and mortise joints on the connector plates 7 directly opposed each other, locking members of locking pins 35 are inserted through holes 46 aligned in the tenons 13 and the mortises 14 to join together the connector plates 7. More particularly, the locking pins 35 are inserted through the holes 45 in the tenons 13 and the mortises 14 from side surfaces 47 of the joined connector plates 7 in a direction perpendicular to the traveling direction of the slider 2. The locking members serving as separation prevention members are preferably made from a pin 35 of having a right circular cylinder shape. The separation prevention pins 35 are inserted from the side surfaces 47 of the joined connector plates 7, that is, from the lateral sides 27 of the carriages 3 in the slider 2 in the direction perpendicular to the traveling direction of the slider 2. This insertion of the locking pins 35 means that the locking pins 35 can be applied and/or withdrawn from the lateral sides 27 of the slider 2 or the side surfaces 47 of the joined connector plates 7 even after the instruments and so on have been mounted on the top 56 of the slider 2. With the linear motion guide unit constructed as stated earlier, the carriages 3 are completely joined together so as not to shift relative to each other in the traveling direction of the slider 2 after the tenon-and-mortise joints have been made between the connector plates on the carriages 3 and the locking pins 35 have been inserted through the holes 46 in the tenon-and-mortise joints.

In the linear motion guide unit of the present invention, the locking pin 35 is made of metallic material and has a dimension conformable to the holes 46 in the connector plates 7, for example, a diameter of $\phi 2$ mm and a length of 9.8 mm. The connector plates 7, because they do not have turnaround passage 15 as in the end cap 4, is remarkably smaller in the lengthwise dimension in the traveling direction of the slider 2, compared with a total overall length of the end caps 4 with the end seals 12, and therefore is shortened by a difference between the total overall length of the end caps 4 with the end seals 12 and only the connector plates 7. It is preferable that the connector plate 7 is made as small as permitted with a thickness t1 or a distance between the front surface 25 and the rear surface 26 extending in parallel with each other. The connector plate 7 used in the version discussed here has a thickness t1 of, for example 3 mm. The connector plate 7 has a configuration conforming to the end cap 4 combined with the retainer plates 8 in front elevation and is composed of the upper portion 60, the side bulges 34 extending downwards from the widthwise opposite ends of the upper portion 60 and retainer parts 19 conforming in shape to a cross section of the retainer plates 8 at locations opposing to the retainer plates 8. The connector plate 7 has the tenons 13 and the mortises 14 at locations where the side bulges merge with the upper portion 60. Thus, the connector plate 7 conforms in shape to the combination of the end cap 4 having the turnaround passages 15 for the rollers 5 and the retainer plates 8 to retain the rollers 10 in the slider 2. Moreover, the retainer parts 19 in the connector plate 7 are made integral with the connector plate 7 to extend inwardly of the side bulges 34 of the connector plate 7 to correspond in place to retainer plates 8 after the connector plates 7 have been fastened to the carriages 3. The retainer parts 19 are recessed at 33 to fit over ends 29 (FIG. 5) of the retainer plates 8 to connect the connector plates 7 with the carriages 3 end to end. The recesses 33 are made to conform in shape in cross section to the ends 29 of the retainer plates 8.

Figure 9:
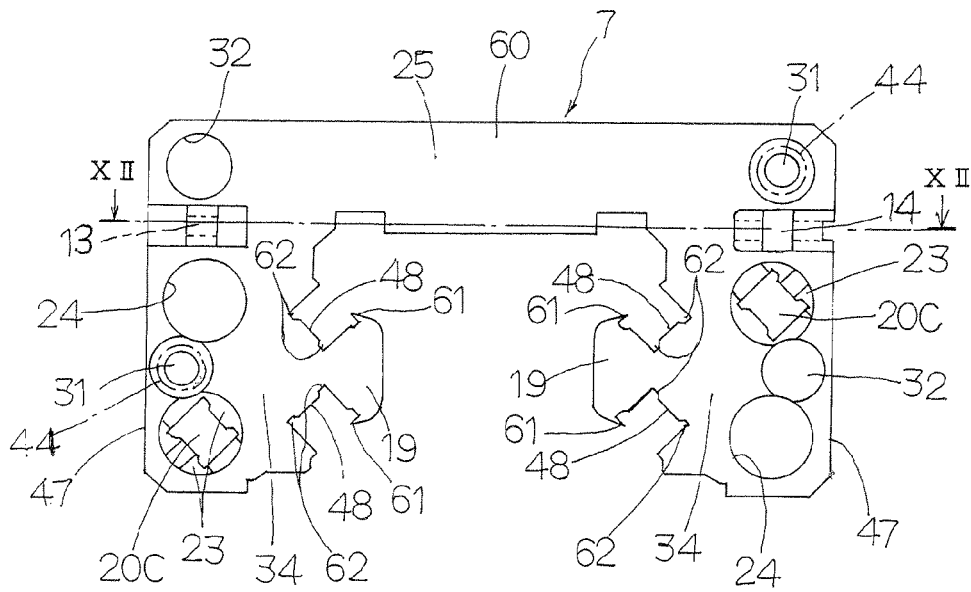
FIG. 9 is a view in front elevation of the connector plate.
Figure 10:
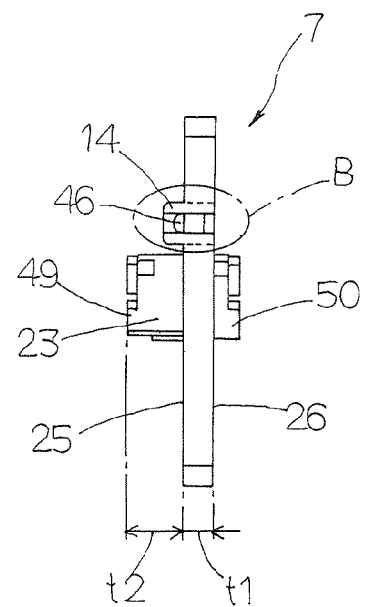
FIG. 10 is a view in side elevation on the left of the connector plate of FIG. 8 to shown a mortise part and spigots to fit into the carriages.
Figure 11:
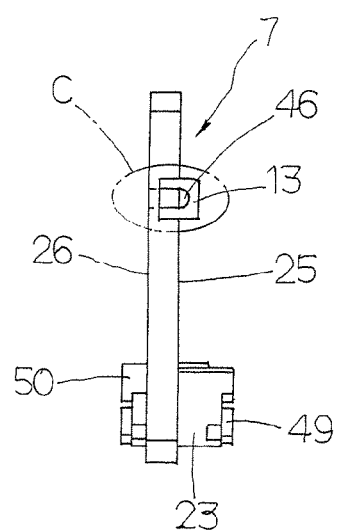
FIG. 11 is a view in side elevation on the right of the connector plate of FIG. 8 to shown a tenon part and spigots to fit into the carriages.
Figure 12:
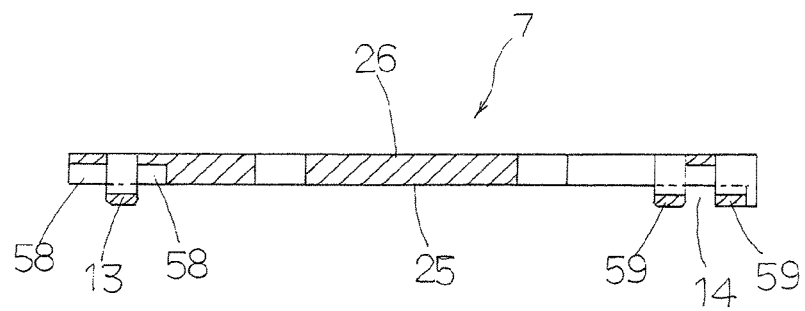
FIG. 12 is a view in transverse section of the connector plate, the view being taken on the plane of the line X II-X II of FIG. 9.
Figure 13:
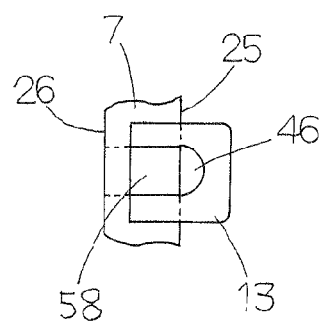
FIG. 13 is an enlarged fragmentary detail showing an area encircled with a sign C of FIG. 11 to illustrate the tenon part.
Figure 14:
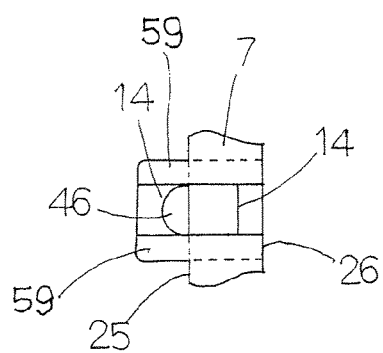
FIG. 14 is an enlarged fragmentary detail showing an area encircled with a sign B of FIG. 10 to illustrate the mortise part.
Figure 15:
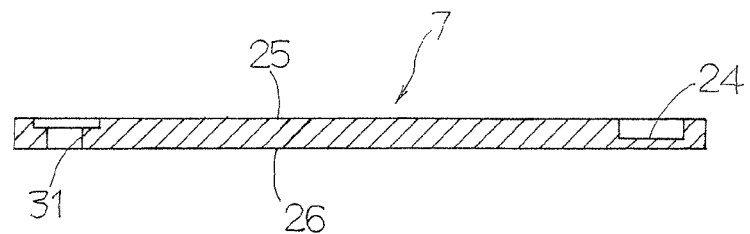
FIG. 15 is a view in transverse section of the connector plate, the view being taken on the plane of the line X V-X V of FIG. 8.
Figure 16:
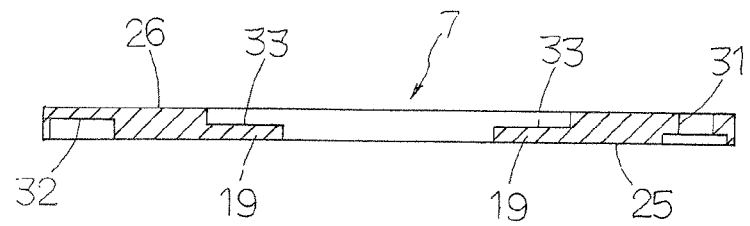
FIG. 16 is a view in transverse section of the connector plate, the view being taken on the plane of the line XVI-XVI of FIG. 8.
Figure 17:
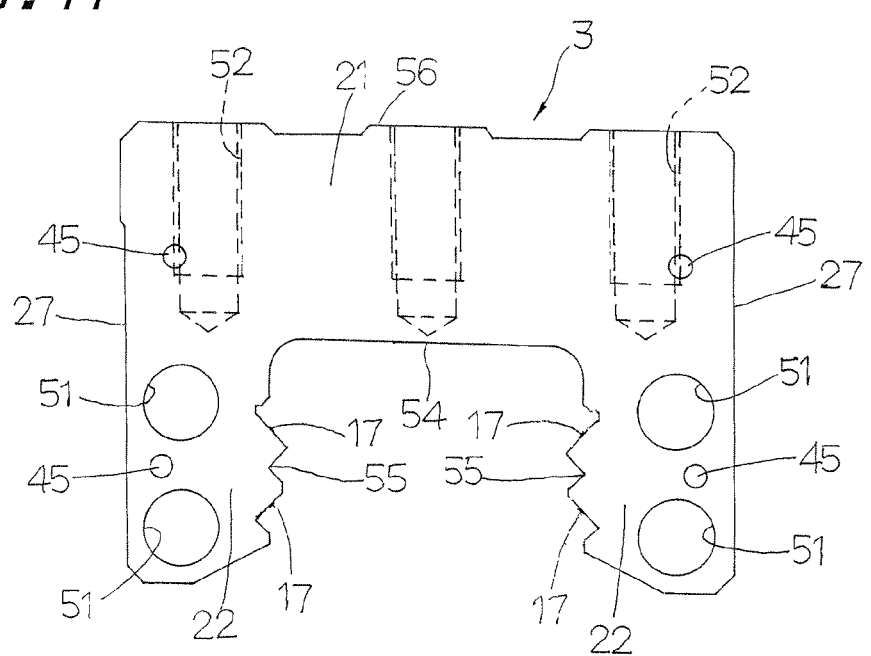
FIG. 17 is a view in end elevation of the carriage to be assembled in the slider.

With the linear motion guide unit of the present invention, the tenon or projection 13 as shown in FIG. 9 is located leftward on the front surface 25 of the connector plate 7 to have a height of 2 mm above the front surface 25 of the connector plate 7. The tenon 13 has a raised portion having a four-sided contour having the hole 46 therein. The raised portion of the tenon 13 is flanked by recesses 58 of a depth of 2 mm. The mortise 14 as shown in FIG. 9 is located rightward on the front surface 25 of the connector plate 7. The mortise 14 has a hole into which the tenon 13 fits. With the mortise 14, the hole is flanked by flanges 59 raised by 2 mm above the front surface 25 of the connector plate 7. The hole in the mortise 14 sinks in a depth of 2 mm below the front surface 25 of the connector plate 7. Moreover, the side bulges 34 of the connector plate 7 are made to have four parts of the return passages of the circulating circuits 30.

With the linear motion guide unit of roller-type in which the four rows of load-carrying races 40 are made in the side bulges 22 of the carriage 3, two rows for each of the side bulges, the connector plates 7 are provided at the side bulges 34 thereof with a socket 24 and a first spigot 23 integral with the connector plate 7, the socket 24 and the first spigot 23 conforming in place to the return passages 20, respectively. More particularly, the first spigot 23 is raised above the front surface 25 of the connector plate 7 and another spigot or a second spigot 50 is raised above the rear surface 26 of the connector plate 7. It will be thus understood that the first spigots 23 fit into the sockets 24 respectively to communicate with each other after the adjoining connector plates 7 have been joined to each other in a relationship such that their front surfaces 25 have made direct face-to-face engagement with each other. With the linear motion guide unit constructed as stated earlier, the connector plate 7 has raceway grooves or third raceway grooves 48 which communicate with the raceway grooves 17 of the carriages 3, but bear no load therein, and return passage segments 20C which are bored through the first spigot 23 integral with the connector plate 7 to communicate with the return passages 20 in the carriages 3.

With the linear motion guide unit, moreover, the first spigot 23 is raised above the front surface of the connector plate 7 across a height of t2 larger than the thickness t1 of the connector plate 7. Upon a phase in which the adjoining connector plates 7 have been joined to each other in a relationship such that their front surfaces 25 have made direct face-to-face engagement with each other, the first spigots 23 on the adjoining connector plates 7 extend past through the sockets 24 on the counterparts 7 into the bores 51 into which the sleeves 9 are inserted to provide the return passage 20, thereby keeping in place at their tips 49, the connector plates 7 with respect to the carriages 3. With the linear motion guide unit of the present invention, more particularly, after the adjacent carriages 3 have been joined to each other by the joint members, including the tenons 13, mortises 14 and locking pins 35, the first spigots 23 on the adjoining connector plates 7 extend past through the sockets 24 on the counterparts 7 to fit at their tips 49 into the bores 51 into which the sleeves 9 are inserted to provide the return passage 20 and at the same time the second spigots 50 on the adjoining connector plates 7 each fit respectively into the bore 51 in its-own-side carriage 3 so that the return passage segments 20C in the connector plates 7 communicate with the return passages 20 in the adjacent carriages 3. Moreover, the first spigots 23 at their tips 49 make a complementary fit with the relevant ends of the sleeves 9 for the return passages. The complementary fit between the sleeves 9 and the tips 49 of the first spigots 23 are in favor of accurate alignment between the return passages 20 in the carriages 3 and the return passage segments 20C in the connector plates 7 to guide the rolling elements 10 in good rolling order without leaning in rolling posture.

With the linear motion guide unit constructed as stated earlier, the return passage segment 20C in the connector plate 7 is composed of the first spigot 23 of, for example, substantially cylindrical shape and the socket 24 of through-hole to fit over the first spigot 23 in the counterpart 7. Thus, after the first spigot 23 in one of the connector plates 7 has fit into the socket 24 in the counterpart connector plate 7, an axial hole extending through the center of the first spigot 23 provides the return passage segment 20C in which the rolling elements 10 are allowed to roll therethrough. Namely, two rows of the return passage segments 20C are made in each of the side bulges 34 of the connector plate 7. The two row of the return passage segments 20C in each side bulge 34 are made with a set of one first spigot 23 and the socket 24 in the connector plate 7. The first spigots 23 and the sockets 24 in the side bulges 34 are turned upside down or staggered in locations with respect to each other of the side bulges 34. Thus, the first spigot 23 on one of the connector plates 7 is formed to fit into the socket 24 on the counterpart connector plate 7.

With the linear motion guide unit of the present invention, the second spigot 50 is raised above the rear surface 26 of the connector plate 7 at a height of 2.5 mm, whereas the first spigot 23 is raised above the front surface 25 of the connector plate 7 at a height of 5.45 mm. The connector plate 7, when viewed from the front surface 25 thereof, as shown in FIG. 9, has at a lower portion of the leftward side bulge 34 thereof the first spigot 23 to provide the return passage segment 20C communicating with an upper race 48 and also at a middle portion of the leftward side bulge 34 thereof the socket 24 to provide the return passage segment 20C communicating with a lower race 48. Moreover, the connector plate 7 when viewed from the front surface 25 thereof has, at a lower portion of the rightward side bulge 34 thereof, the socket 24 to provide the return passage segment 20C communicating with another upper race 48 and also, at a middle portion of the rightward side bulge 34 thereof, the first spigot 23 to provide the return passage segment 20C communicating with another lower race 48.

Figure 8:
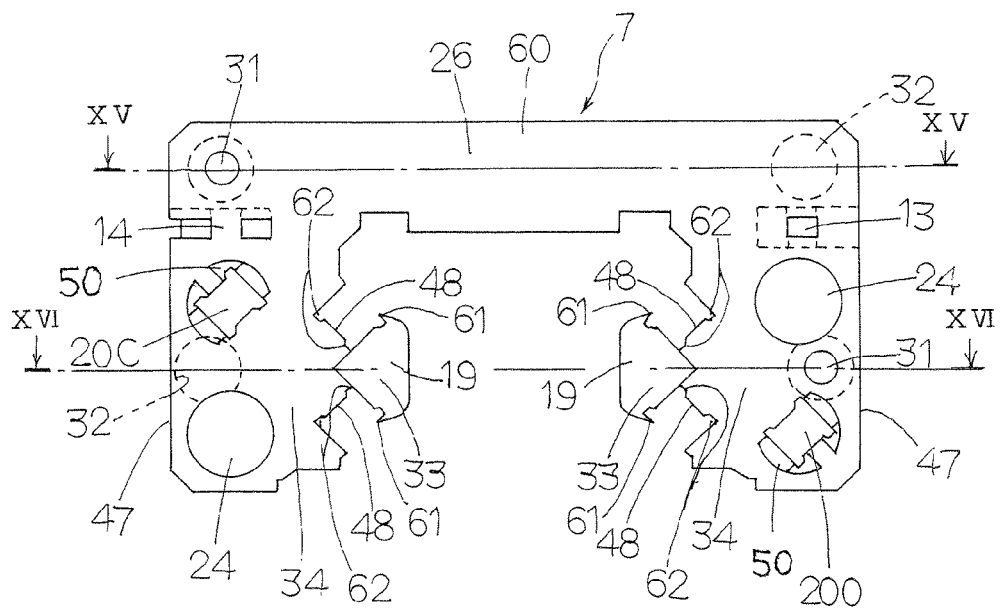
FIG. 8 is a view in rear elevation of the connector plate.

With the linear motion guide unit constructed as stated earlier, the connector plate 7 when viewed from the rear surface 26 thereof, as shown in FIG. 8, has, at a middle portion of the leftward side bulge 34 thereof, the first spigot 23 to provide the return passage segment 20C communicating with the lower race or raceway groove 48 and also, at a lower portion of the leftward side bulge 34 thereof, the socket 24 to provide the return passage segment 20C communicating with the upper race or raceway groove 48. Moreover, the connector plate 7 when viewed from the rear surface 26 thereof has, at a lower portion of the rightward side bulge 34 thereof, the first spigot 23 to provide the return passage segment 20C communicating with another upper race or raceway groove 48 and also, at a middle portion of the rightward side bulge 34 thereof, the socket 24 to provide the return passage segment 20C communicating with another lower race or raceway grooves 48.

The connector plate 7 is provided in each side bulge 34 thereof with two lines of the raceway grooves 48 which communicate with two raceway grooves 17 in each of the side bulges 22 of the carriages 3, but bear no load therein. At the raceway grooves 48 in the connector plate 7, the retainer parts 19 to keep the rollers 10 thereon are made integral with the side bulges 34 of the connector plate 7. The retainer parts 19 have pawls 61 to embrace or come into rolling contact with rolling surfaces 57 of the rollers 10, and have the same shape as retainer plates 8 fastened to the carriage 3 to keep the rollers 10 from falling away or separating from the load-carrying races 40. The retainer parts 19, moreover, have relief sides 62 lying along the rolling surfaces 57 of the rollers 10 to avoid interference or rubbing with the axial ends of the rollers 10. The retainer parts 19 are recessed at 33 on the rear surface 26 of the connector plate 7 to conform to or make contact with the ends 29 of the retainer plates 8. The recesses 33 on the retainer parts 19, to make contact with the retainer plates 8, sink below the rear surface 26 of the connector plate 7 by about 1.5 mm. The connector plates 7 are made of the same sort of material as in synthetic resins of the end caps 4, particularly, polyoxymethylene (POM), known as polyacetal which is one of general-purpose engineering plastics.

Comparing the linear motion guide unit of the present invention, hereinafter referred as version A, in which plural carriages 3, three carriages 3 in this version A, are joined together with the connector plates 7 in the slider 2 and another type of linear motion guide unit, hereinafter referred as version B, not shown, in which plural sliders, for example, three sliders, each of which has only one carriage are arranged in series in the lengthwise direction. In the version A, the adjoining carriages 3 are joined each other through two connector plates 7. In the version B, the adjoining carriages are jointed across two end caps and two end seals. The connector plates 7, because of having neither the turnaround passages as in the end caps nor the lips as in the end seals, help reduce length in the lengthwise direction by the total length of the combined end caps and end seals in the version B. As a result, the differences in function and effect between the versions A and B will be found as follows.

1. The connectors 7 are apparently smaller in the lengthwise direction than the total length of the end caps and end seals. Thus, the version A could be made smaller in overall length than the version B by the difference between the length of the connectors 7 and the combined length of the end caps and end seals, if there is no difference in the load rating applied to the slider.

2. Considering assemblage of the table measuring 500 mm long with the linear motion guide unit in which the slider is constructed as in the version A or B with the carriages common in length fits over the guide rail of about 35 mm wide, the version A can afford to arrange up to five carriages in series in the lengthwise direction of the guide rail, whereas the version B allows only four carriages to lie in series in the lengthwise direction of the guide rail. Thus, the carriages in the version A are one more than in the version B.

According to the teachings as stated earlier, it will be found that the version A helps enhance the load rating by 25% compared to the version B.

Thus, the linear motion guide unit of the version A constructed as stated earlier succeeds in achieving the high stiffness or rigidity and the increased load rating within a limited space with no need of additional working on the carriages to fasten the connector plates on the carriages 3. With the version A, the slider can be saved in space, particularly in the lengthwise dimension. The more carriages that are arranged in series in the lengthwise direction, the greater will be the functions and effects obtained therefrom.

What is claimed is:

1. A linear motion guide unit comprising:
 a guide rail having at least one first raceway groove extending lengthwise on each longitudinal side of the guide rail,
 a slider that fits over or conforms to the guide rail for movement relative to the guide rail, the slider being composed of carriages adjacent to each other and juxtaposed in series in a lengthwise direction, the carriages each having a second raceway groove lying in opposition to each respective first raceway groove of the guide rail to define a load-carrying race between respective opposed first raceway grooves and second raceway grooves,
 a return passage extending in parallel with each respective second raceway groove,
 an end cap secured to each opposite end of the slider and each end cap comprising at least one turnaround passage to connect the respective load-carrying races with the respective return passages, and
 a plurality of rolling elements disposed to roll through circulating circuits, each of the circulating circuits made up of respective load-carrying races, respective return passages, and respective turnaround passages;
 wherein adjacent carriages are joined together at a joint, each joint comprising two connector plates, each connector plate has an identical structure, one connector plate being fastened to each carriage defining the respective joint, each connector plate having a front surface, wherein respective front surfaces face each other at each joint, and each connector plate being provided on the front surface with a tenon or projection, and a mortise which are widthwise spaced away from each other; and
 wherein the adjacent carriages at each joint are joined together such that respective connector plates are in face-to-face engagement on respective front surfaces of the connector plates and the tenons fit into the mortises to provide tenon-and-mortise joints.

2. A linear motion guide unit constructed as defined in claim 1, wherein the connector plates are secured to the carriages by screws which are extended through fastening holes in the connector plates and are tightened into threaded holes drilled in ends of the carriages.

3. A linear motion guide unit constructed as defined in claim 1, wherein locking pins are inserted through holes in the tenons and through the mortises to join together the connector plates at each joint.

4. A linear motion guide unit constructed as defined in claim 3, wherein the locking pins are inserted through side surfaces of the tenons in a direction perpendicular to a traveling direction of the slider.

5. A linear motion guide unit constructed as defined in claim 1, wherein the connector plates each have a socket, a first spigot, and a second spigot, the first spigot and the second spigot being integral with the connector plates and conform in place to respective return passages in the carriages, the first spigot protruding from the front surface of each connector plate and the second spigot protruding from a rear surface of each connector plate, and
 wherein the first spigot on one of the connector plates in each joint fits into the socket of the other connector plate in each joint.

6. A linear motion guide unit constructed as defined in claim 5, wherein upon a phase in which adjacent carriages are joined together with the connector plates, the first spigot on one of the connector plates in each joint extends through the socket of the other connector plate in each joint into an opposite carriage and at the same time the second spigot of the one connector plate fits into its-own-side carriage.

7. A linear motion guide unit constructed as defined in claim 6, wherein the connector plates each have a third raceway groove which communicates with one of the second raceway grooves of the carriages, and a return passage segment which communicates with one of the return passages in the carriages, the return passage segment in each connector plate extending through the first spigot and the second spigot which are integral with the connector plates.

8. A linear motion guide unit constructed as defined in claim 7, wherein the first spigots are protruded from the front surfaces of the connector plates by a thickness larger than a thickness of the connector plates and wherein after adjacent connector plates have been joined to each other in each joint, the front surfaces of the respective adjacent connector plates are in direct face-to-face engagement with each other, at each joint the first spigot on one connector plate extends through the socket in the other connector plate and into a bore formed in the opposite carriage, a sleeve inserted into the bore to provide the return passage, thereby keeping in place, at tips of the respective first spigots, the respective connector plates with respect to the carriages.

9. A linear motion guide unit constructed as defined in claim 1, wherein each connector plate has retainer parts integral with each connector plate in conformity with retainer plates which are fastened to each carriage to keep the rolling elements against falling apart from the carriages, the retainer parts extending inwardly of side bulges of the connector plates to correspond in place to retainer plates after the connector plates have fastened to the carriages, and wherein the retainer parts are recessed to fit over ends of the retainer plates to set in place the connector plates relative to the retainer plates.

* * * * *